(12) United States Patent
Kuo

(10) Patent No.: US 12,222,736 B2
(45) Date of Patent: Feb. 11, 2025

(54) FLOW CONTROL VALVE AND SPA RECIRCULATION SYSTEM WITH HEAT PUMP USING THE VALVE

(71) Applicant: Balboa Water Group, LLC, Costa Mesa, CA (US)

(72) Inventor: Steven Kuo, Chino Hills, CA (US)

(73) Assignee: Balboa Water Group, LLC, Costa Mesa, CA (US)

(*) Notice: Subject to any disclaimer, the term of this patent is extended or adjusted under 35 U.S.C. 154(b) by 162 days.

(21) Appl. No.: 18/104,676

(22) Filed: Feb. 1, 2023

(65) Prior Publication Data

US 2024/0201715 A1 Jun. 20, 2024

Related U.S. Application Data

(60) Provisional application No. 63/434,049, filed on Dec. 20, 2022.

(51) Int. Cl.
| | |
|---|---|
| *G05D 16/10* | (2006.01) |
| *E03C 1/02* | (2006.01) |
| *E03C 1/044* | (2006.01) |

(52) U.S. Cl.
CPC .......... *G05D 16/103* (2013.01); *E03C 1/044* (2013.01); *E03C 2001/026* (2013.01)

(58) Field of Classification Search
CPC .... G05D 16/103; G05D 7/0133; E03C 1/044; E03C 2001/026
USPC ............................................... 4/541.1–541.3
See application file for complete search history.

(56) References Cited

U.S. PATENT DOCUMENTS

| | | | |
|---|---|---|---|
| 3,289,690 A | * 12/1966 | Frantz | G05D 16/10 |
| | | | 92/163 |
| 3,319,648 A | 5/1967 | Donner | |
| 3,402,735 A | * 9/1968 | Kates | G05D 7/0133 |
| | | | 137/501 |
| 3,424,196 A | 1/1969 | Donner | |
| 3,805,824 A | 4/1974 | Robbins, Jr. | |
| (Continued) | | | |

FOREIGN PATENT DOCUMENTS

| | | | | |
|---|---|---|---|---|
| AU | 2020277273 A1 | * 1/2021 | | C25B 1/04 |
| CN | 106870794 B | * 11/2019 | | E03C 1/0404 |
| (Continued) | | | | |

OTHER PUBLICATIONS

European Patent Office Partial Search Report; 23214761.1-1201;Jul. 22, 2024; Munich.

(Continued)

*Primary Examiner* — Lori L Baker
(74) *Attorney, Agent, or Firm* — Larry K. Roberts

(57) ABSTRACT

A flow control valve for a bathing installation. The flow control valve is configured to operate between an open state and a closed state in dependence on the applied water pressure. As water pressure increases, the valve progressively reduces flow dynamically, until flow increases to a point that the valve is placed in the closed state. The valve may be placed in the bathing installation recirculating water path downstream of a bypass path and upstream of a heat pump. By regulating water flow and pressure to the heat pump, the heat pump may be operated in a flow rate for efficient operation. The valve also prevents water pressure at a high level which may damage the heat pump.

15 Claims, 8 Drawing Sheets

(56) References Cited

U.S. PATENT DOCUMENTS

| | | | | |
|---|---|---|---|---|
| 3,844,338 | A * | 10/1974 | Hilgemann | F24F 5/0071 4/493 |
| 4,663,613 | A * | 5/1987 | Raleigh | E04H 4/129 340/407.1 |
| 5,742,954 | A * | 4/1998 | Idland | F04B 19/06 417/413.1 |
| 5,904,177 | A * | 5/1999 | Mullin | G05D 7/0133 137/503 |
| 5,983,416 | A * | 11/1999 | Idland | A61H 33/6063 4/492 |
| 6,405,387 | B1 * | 6/2002 | Barnes | A61H 33/0087 4/541.1 |
| 7,329,343 | B1 * | 2/2008 | Barnes | B01F 25/31421 204/660 |
| 7,875,173 | B1 * | 1/2011 | Barnes | A61H 33/14 4/541.1 |
| 8,561,639 | B1 * | 10/2013 | Crompton | G05D 7/0133 137/504 |
| 8,713,724 | B1 * | 5/2014 | Goettl | E04H 4/1236 4/507 |
| 9,822,902 | B2 * | 11/2017 | Esche | E03C 1/057 |
| 2002/0179153 | A1 * | 12/2002 | Taylor | F16K 15/182 137/540 |
| 2002/0179154 | A1 * | 12/2002 | Taylor | F16K 1/308 137/541 |
| 2010/0017952 | A1 | 1/2010 | Thweatt, Jr. | |
| 2010/0031435 | A1 * | 2/2010 | Lemire | F04D 15/0011 4/541.3 |
| 2011/0239362 | A1 * | 10/2011 | Jacobs | E04H 4/1236 4/509 |
| 2018/0179742 | A1 * | 6/2018 | Yuan | F16K 11/22 |
| 2019/0317534 | A1 * | 10/2019 | Nelson | G05D 16/10 |
| 2020/0002924 | A1 * | 1/2020 | Ball | E03C 1/057 |
| 2021/0102362 | A1 * | 4/2021 | Rosandich | E03C 1/266 |
| 2022/0025666 | A1 | 1/2022 | Dzindo | |
| 2022/0167778 | A1 * | 6/2022 | Pirutin | E03C 1/044 |
| 2022/0253077 | A1 * | 8/2022 | Chandrashekar | F03G 7/06145 |
| 2023/0053287 | A1 * | 2/2023 | Hammond | B05B 7/241 |
| 2023/0061679 | A1 * | 3/2023 | Subramanian | E03C 1/0404 |
| 2023/0062387 | A1 * | 3/2023 | Subramanian | B64D 11/02 |

FOREIGN PATENT DOCUMENTS

| | | | | |
|---|---|---|---|---|
| DE | 202017101403 U1 * | 7/2018 | | F16K 27/0236 |
| EP | 4116511 A1 * | 1/2023 | | E03D 1/32 |
| JP | H10185312 A | 7/1998 | | |
| JP | 2006002960 | 1/2006 | | |
| WO | WO 2010064406 A1 | 6/2010 | | |
| WO | WO 2017212613 | 12/2017 | | |
| WO | WO 2018142473 | 8/2018 | | |
| WO | WO-2018140123 A9 * | 9/2018 | | E03B 7/071 |
| WO | WO-2019111263 A1 * | 6/2019 | | B01F 3/04808 |

OTHER PUBLICATIONS

European Patent Office Extended Search Report; EP 23214761; Nov. 21, 2024; Munich.

* cited by examiner

FLOW CONTROL VALVE AND SPA RECIRCULATION SYSTEM WITH HEAT PUMP USING THE VALVE

CROSS-REFERENCE TO RELATED APPLICATION

This application claims priority to U.S. Provisional Patent Application No. 63/434,049, filed Dec. 20, 2022, the entire contents of which are incorporated herein by this reference.

BACKGROUND

Bathing installations such as spas and whirlpool baths typically include water heating systems in recirculating water flow paths to heat the water to desired temperatures. The water heaters may utilize electrical power for heating elements submerged in water.

Heat pumps have also been employed as water heating and cooling systems, to take advantage of the higher efficiency and save power, resulting in lower electrical costs to operate the system.

Heat pumps typically require an input water flow in a narrow range, e.g. a nominal flow rate plus or minus ten percent or so, for optimal efficiency. Further, the input water flow should be less than a maximum flow rate to ensure the heat pump is not damaged over extended use. These constraints have been difficult to achieve.

The present invention addresses these constraints.

BRIEF DESCRIPTION OF THE DRAWINGS

Features and advantages of the disclosure will readily be appreciated by persons skilled in the art from the following detailed description when read in conjunction with the drawing wherein:

FIG. 6A illustrates the valve with the plunger in a fully open position relative to the retainer, as the water flow is insufficient to move the plunger against the spring pressure from a fully open position. FIG. 6B illustrates the water flow condition in which the plunger has moved from the fully open position to an intermediate position allowing some water flow, in response to increased water flow. FIG. 6C illustrates the plunger fully seated against the retainer, closing off water flow except for some leakage.

DETAILED DESCRIPTION

Figure 1:
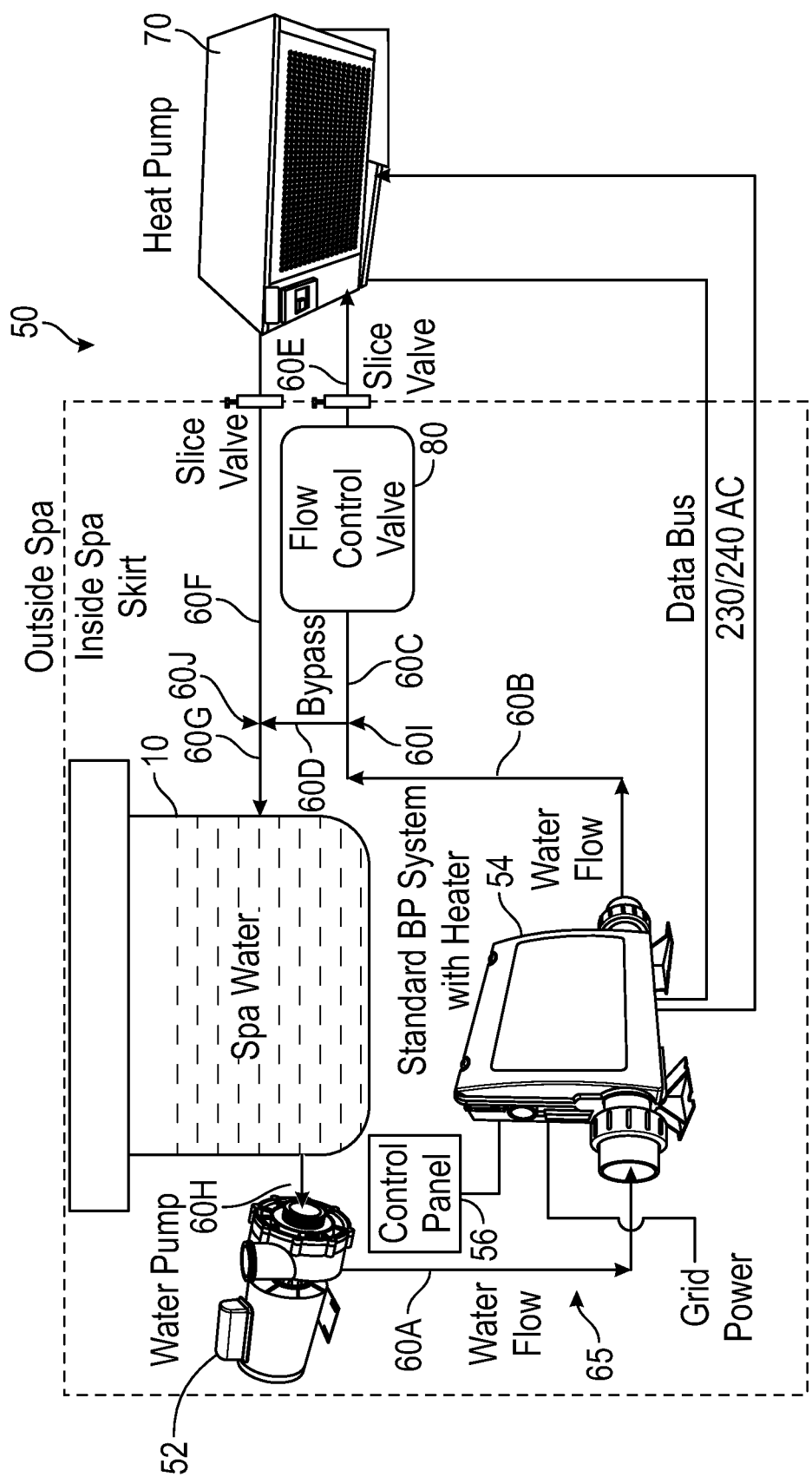
FIG. 1 is a diagrammatical view illustrating an exemplary embodiment of a spa installation employing a heat pump and flow control valve in accordance with aspects of the invention.

In the following detailed description and in the several figures of the drawing, like elements are identified with like reference numerals. The figures may not be to scale, and relative feature sizes may be exaggerated for illustrative purposes.

FIG. 1 illustrates an exemplary embodiment of a bathing installation 50 employing aspects of the invention. In this embodiment, the bathing installation is a spa installation, in which a spa tub 10 holds a volume of spa water. The spa tub includes one or more inlet ports such as jets, and an outlet port connected to a suction side of water pump 52. As is well known in the art, the spa typically has a series of jets (not shown) fed by a water manifold (not shown).

A recirculating water flow path 60 formed by pipe segments 60A, 60B . . . 60G and 60H delivers heated water to the inlet ports or manifold and draws water from the spa tub. The water may be heated by a spa pack 54 including a controller and an electrode heating element, or by heat pump 70, or both, depending on the mode of operation of the spa system, typically under control of the spa pack controller. Water exiting the spa pack 54 is delivered through a flow control valve 80 to the heat pump 70.

There are several water flow constraints imposed on the system of FIG. 1. One constraint is the minimum required flow rate through the spa pack heater. Other constraints are imposed by the heat pump itself. Heat pumps typically require an input water flow in a narrow range, e.g. a nominal flow rate plus or minus ten percent or so, for optimal efficiency. Further, the input water flow should be less than a maximum flow rate to ensure the heat pump is not damaged over extended use. For a typical installation, the minimum flow through the spa pack heater exceeds the maximum flow rate through the heat pump to prevent damage, as well as the optimal flow rate for the heat pump. A bypass water line 60D may be inserted in the water flow path but how to modulate the bypass flow to meet the several constraints is difficult. When a single-speed circulation pump is used for the water pump, it is difficult for the OEMs (original equipment manufacturers) or installers (when the heat pump is installed after the spa is installed) to measure the water flow to ensure that the constraints for the heat pump are satisfied. In the past, spa installations have employed manually-operated ball valves, not a flow control valve as described below. Two-speed water pumps, commonly used in spa installations in the US and Canada, could not be employed, since when the pump is at low speed, and the required flow rate for optimum efficiency of the heat pump is met, then the maximum flow rate constraint through the heat pump would be violated when the water pump is set to the high speed. And if the ball valve is manually adjusted to protect against the maximum flow rate constraint violation at the high speed, then the optimum efficiency flow rate constraint will be violated (the flow will be too low) when the water pump is set to the low speed. The use of a flow control valve in accordance with aspects of the invention provide a solution to these issues.

The water flow path 60 includes pipe segment 60A connected to the output of water pump 52 and to the input of spa pack 54. Pipe segment 60B connects the output of the spa pack 54 to pipe T fitting 601, with the through port connected to flow control valve 80 via pipe section 60C. The output of the valve 80 is connected to one end of pipe section 60E, and the other end of the pipe section 60E is connected to the inlet of the heat pump 70. Pipe section 60F connects the output of the heat pump 70 to T fitting 60J. Pipe section 60G connects the through port of fitting 60G to the inlet port of the spa tub. The outlet port of the spa tub is connected by pipe section 60H to the suction side of pump 52.

The spa pack 54 receives electrical power, typically 230/240 V AC (50-60 Hz). The spa pack controls the application of electrical power to the pump 52, the spa pack heater and the heat pump 70. A spa control panel 56 is in electrical communication with the spa pack, and includes a display panel for display of spa information and status as well as user input devices such as a touch screen and/or switches to enter user commands. A data bus is provided between the spa pack and the heat pump, allowing the spa pack controller to control operation of the heat pump as well as to receive status data from the heat pump.

In accordance with aspects of the invention, the flow control valve 80 functions to regulate water flow into the heat pump to a nominal value plus/minus ten percent, when the pump 52 is a single-speed circulation pump. The nominal value is selected to provide optimum efficiency for the heat pump. For one heat pump example, the nominal value is 11.9 gallons per minute (GPM), although this will be dependent on the particular design of the heat pump. For the case in which the water pump 52 is a two-speed pump, and for the pump low speed operation, the flow control valve regulates the water flow to the heat pump to the nominal value plus/minus ten percent. If the water pump is pumping at the high speed, the flow control valve regulates the water flow to the heat pump to be less than a predetermined flow rate which can cause damage to the heat pump. For the example heat pump, that predetermined flow rate is 17.9 GPM. The flow control valve must also operate at a flow rate through the spa pack heater of at least a minimum flow rate to avoid damage to the heater. In an exemplary embodiment of the spa pack heater, the minimum flow rate is 23 GPM.

Figure 2:
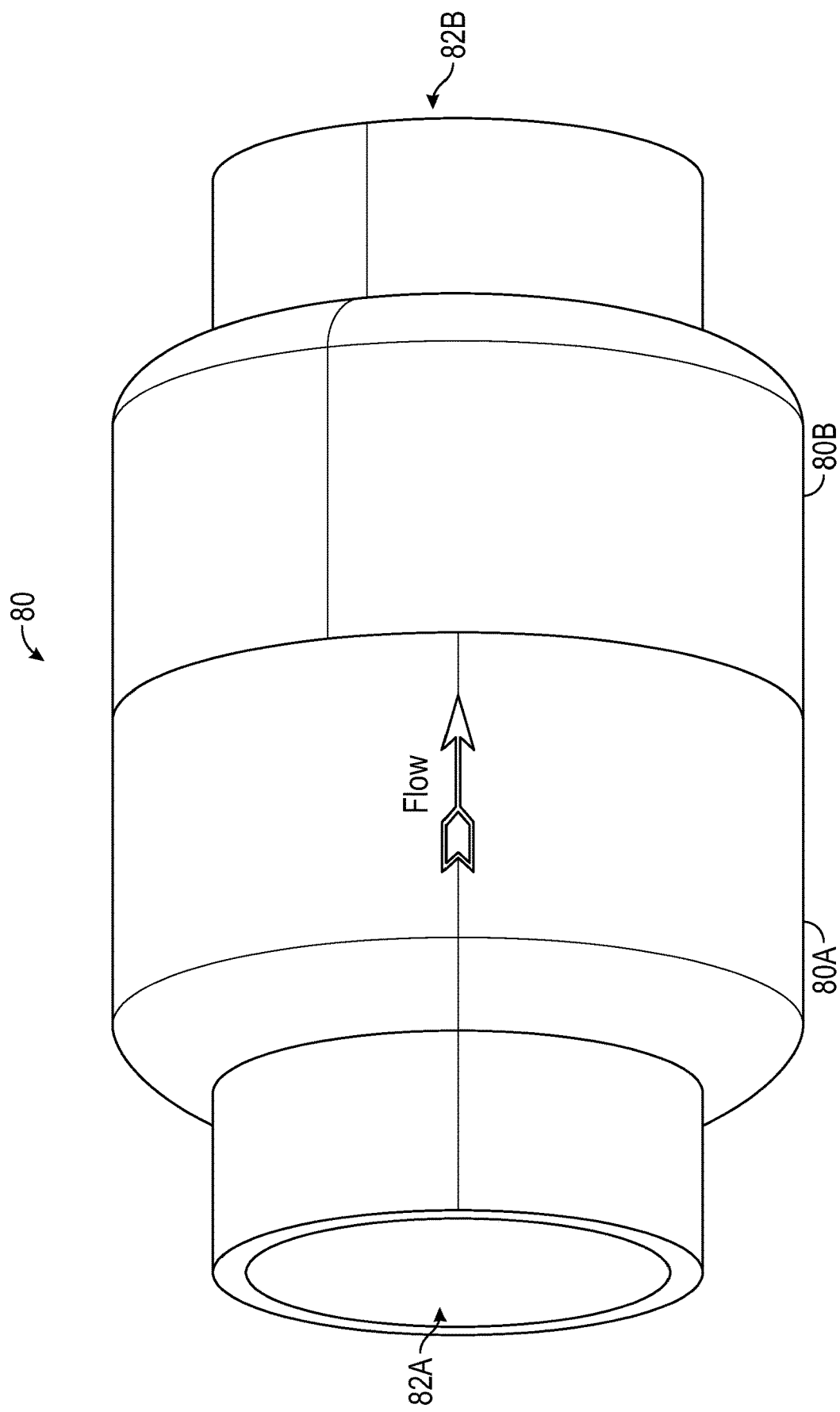
FIG. 2 illustrates an exemplary embodiment of a flow control valve for the system of FIG. 1.

Exemplary embodiments of flow control valve configured to perform these functions are illustrated in FIGS. 2-7C. FIG. 2 is an isometric view of the flow control valve 80. Inlet and outlet ports 82A, 82B are configured to connect to pipe segments of the water flow path. In an exemplary embodiment, the ports accept 2-inch diameter pipes. In an exemplary embodiment, the valve includes a housing formed by housing halves 80A, 80B which are glued together.

Figure 3:
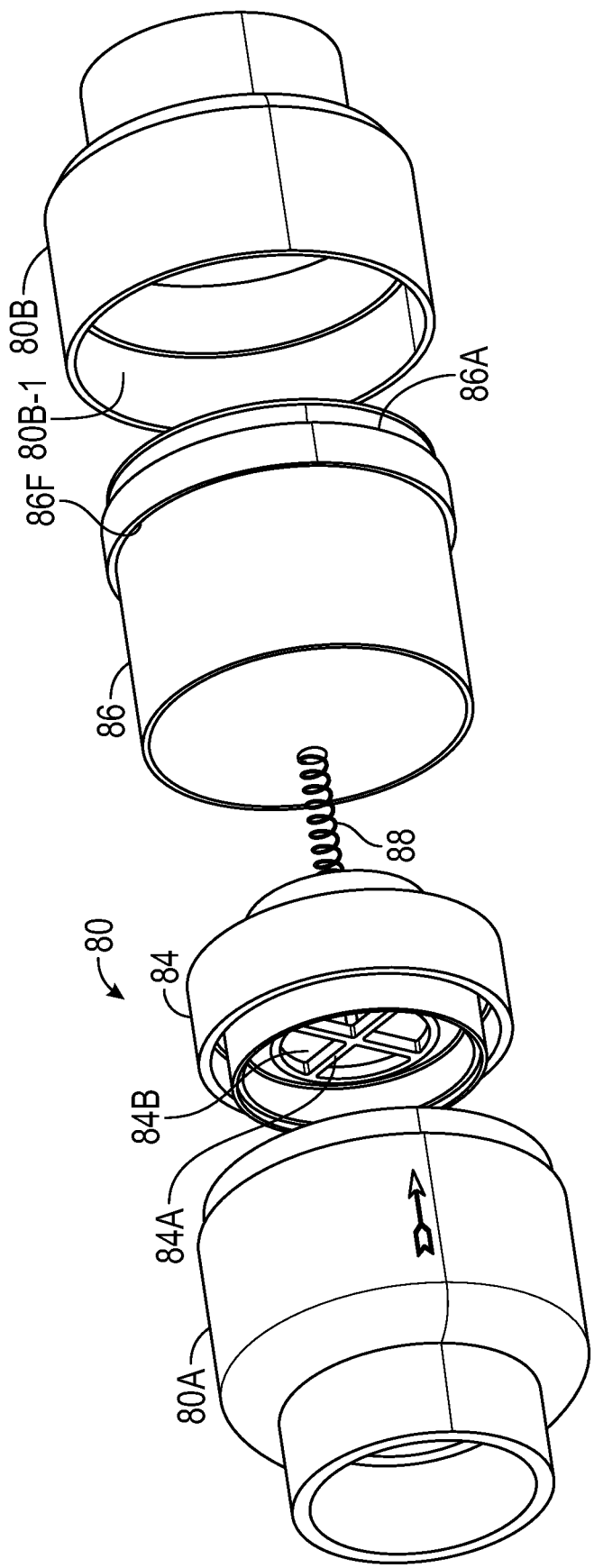
FIG. 3 is an exploded view of an exemplary embodiment of a flow control valve.

FIG. 3 is an exploded view of the flow control valve of FIG. 2. There are three internal parts of the valve, which are fitted inside the housing 80A, 80B. A plunger structure 84 is configured for sliding movement inside a retainer structure 86 between a fully open position and a closed position. An exemplary dimensional tolerance of the gap between the plunger structure and the retainer structure is 0.015 inch+/−.005 inch. The housing, plunger structure and retainer structure are fabricated of plastic, such as PVC. The plunger structure is biased to the open position by bias structure 88, which in this exemplary embodiment is a spring.

The plunger structure 84 includes a transverse web structure 84A, defining four openings or orifices 84B, through which water flows when the plunger structure is not in the closed position. The size of the orifices is a design parameter. The transverse web structure includes a spring retainer post structure 84K extending toward the transverse structure 86C of the retainer structure.

Figure 4A:
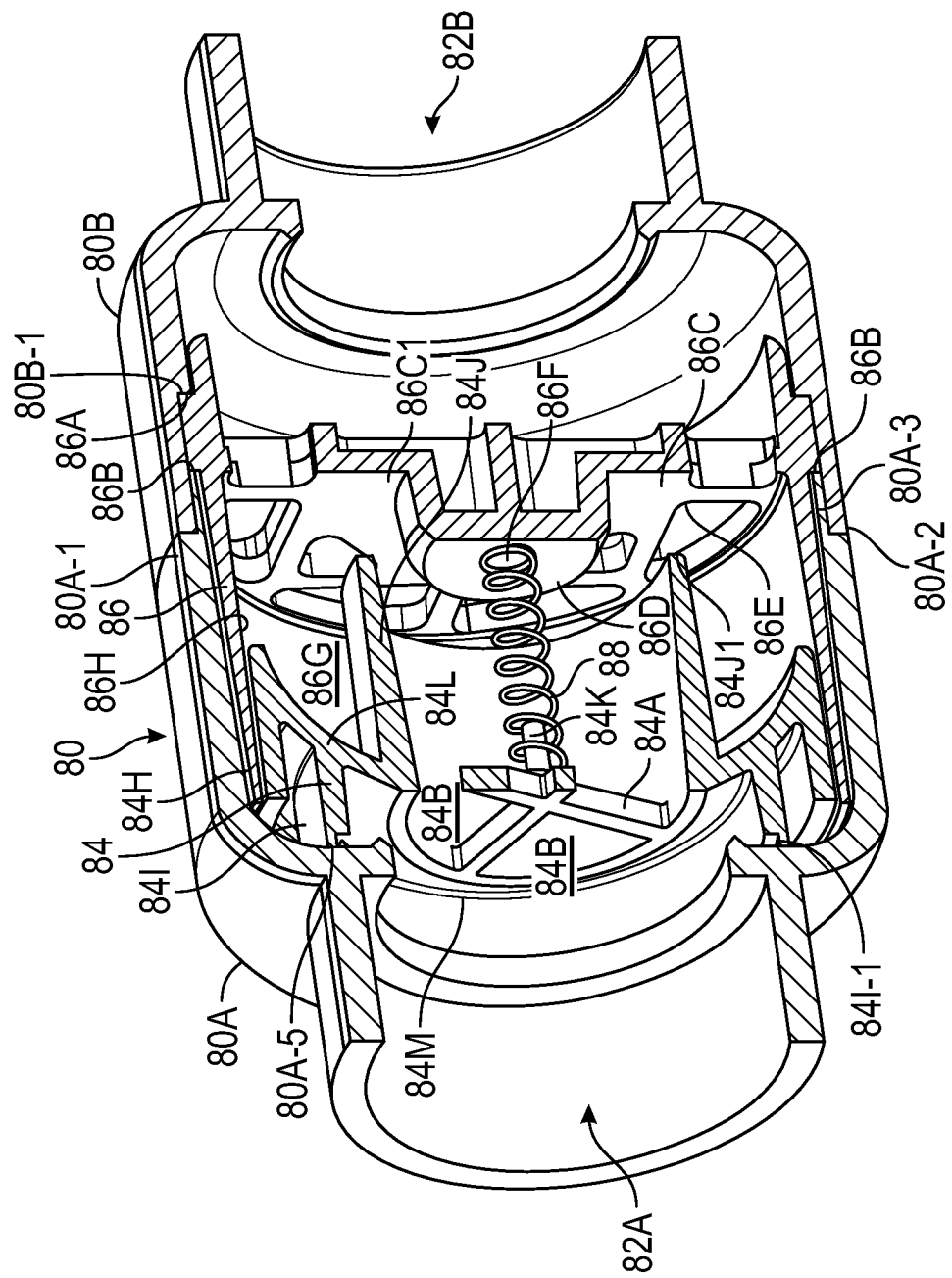
FIG. 4A is an isometric cutaway view of a flow control valve as in FIG. 3, with a plunger element configured for a low speed or single speed pump.
Figure 4B:
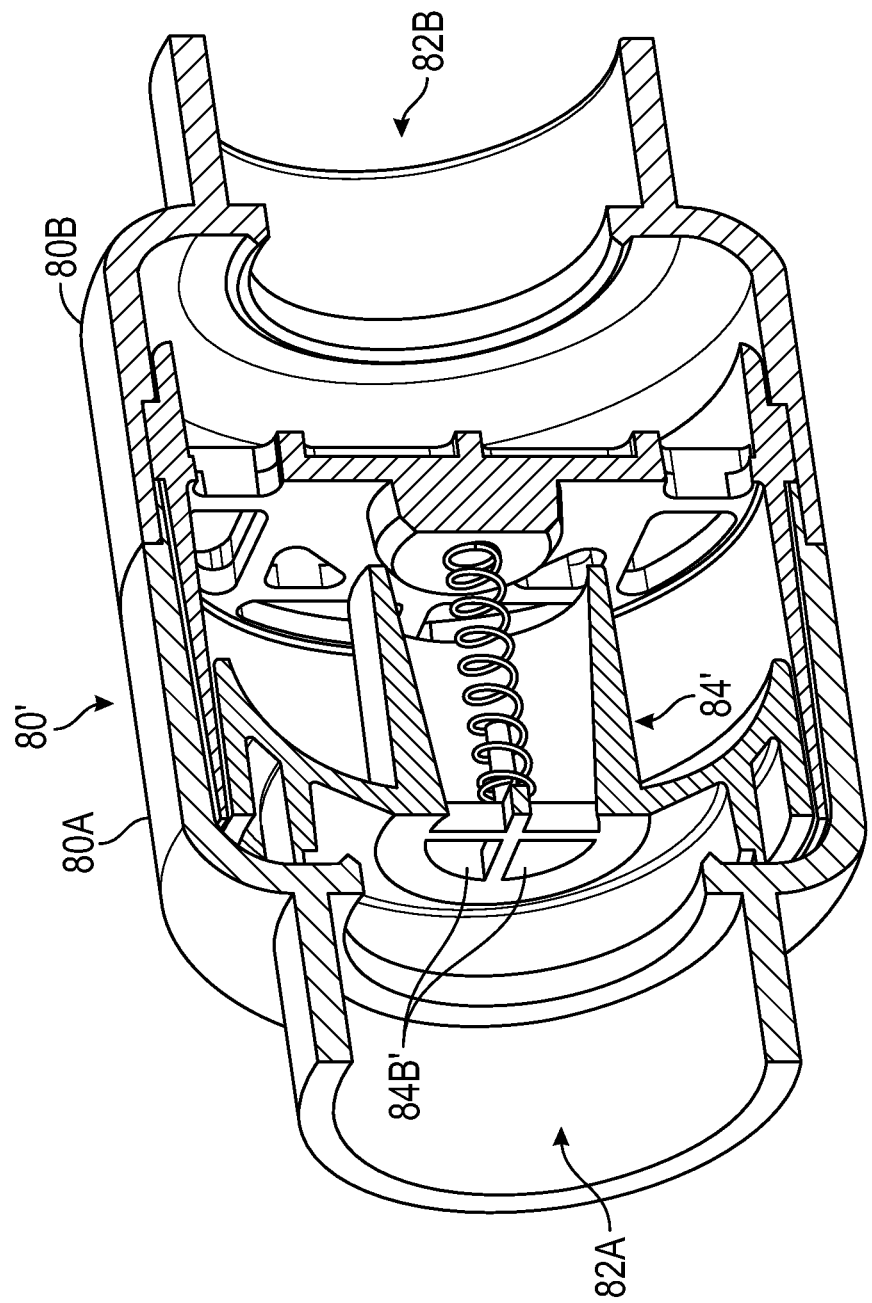
FIG. 4B is an isometric cutaway view similar to FIG. 4A, but with a different plunger element configured for a high speed pump.

The retainer structure 86 includes an external peripheral shoulder 86A which seats against the internal peripheral shoulder 80B-1 to register the position of the retainer structure relative to the housing 80B (see FIGS. 4A and 4B). An external peripheral shoulder 86B is contacted by surface 80A-3 of the housing half 80A when the housing halves are assembled together, securing the position of the retainer structure 86 within the assembled housing halves 80A, 80B.

The retainer structure 86 further includes a transverse structural portion 86C (FIG. 4A), extending across the interior cavity 86G of the retainer structure. The transverse structural portion has a protruding center boss portion 86D with a spring retainer post 86F extending toward the input opening 82A. The transverse structural portion also has a plurality of peripheral openings 86E through the structure and outside of the center boss portion, which openings permit water flow through the transverse structural portion when the plunger portion 84 is not in the closed position.

The spring 88 is held in position by fitment onto the spring retainer posts 84K and 86F (FIG. 4A).

Embodiments of the plunger structure 84 are illustrated in FIGS. 4A-5D. The embodiment of FIGS. 4A and 5A has an outer peripheral cylindrical surface 84H which has an outer diameter sized to fit within the cylindrical surface 86H of the retainer structure 86, with a tolerance designed to allow sliding movement of the plunger structure within the retainer structure, yet without allowing significant water flow in the small gap between the surfaces 84H and 86H. An exemplary tolerance dimension is 0.015 inch. The plunger structure 84 further includes an interior cylindrical surface 84I inboard of surface 84H, and extending from concave surface portion 84L (FIG. 4A). The tip 84I-1 of surface 84I protrudes further than the tip of the outer cylindrical surface 84H, and serves as a stop surface against surface 80A-5 of the housing half 80A, defining the open position of the valve.

The plunger structure 84 further includes an interior cylindrical surface 84J extending downwardly from concave surface portion 84L. Surface 84J has a draft for molding purposes, but is a true cylinder otherwise. The distal edge 84J1 of the interior cylindrical surface 84J serves as a stop surface against the solid surface 86C1 of the transverse structure 86C surrounding the boss 86D. With the plunger structure moved toward the outlet port 82A, the distal edge 84J1 will stop against the solid surface 86C1, cutting off flow through the apertures 86E in the transverse structure 86C. This position of the plunger 84 is the off position.

FIG. 4B illustrates another embodiment of the valve 80', which is identical to valve 80 illustrated in FIG. 4A, except that the plunger 84' has smaller orifices 84B' than the orifices 84B of valve 80. The valve 80' of FIG. 4B will allow lower water flow through the valve than valve 80. The size of the orifices is a design parameter, for matching the valve to the water pump capacity, for example. The size of the bypass pipe 60D (FIG. 1) is also another design parameter.

Figure 5B:
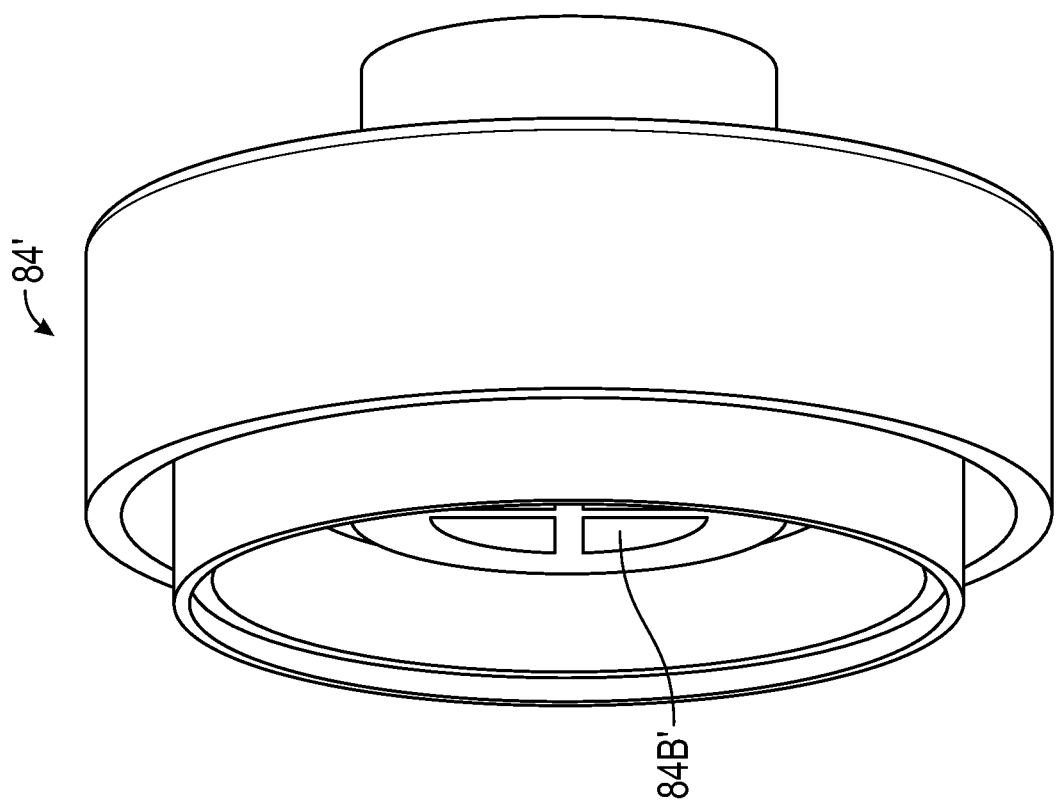
FIGS. 5A and 5B illustrate respective flow control valve plungers for low flow and high flow pumps, respectively, in which the orifices have different sizes.
Figure 5A:
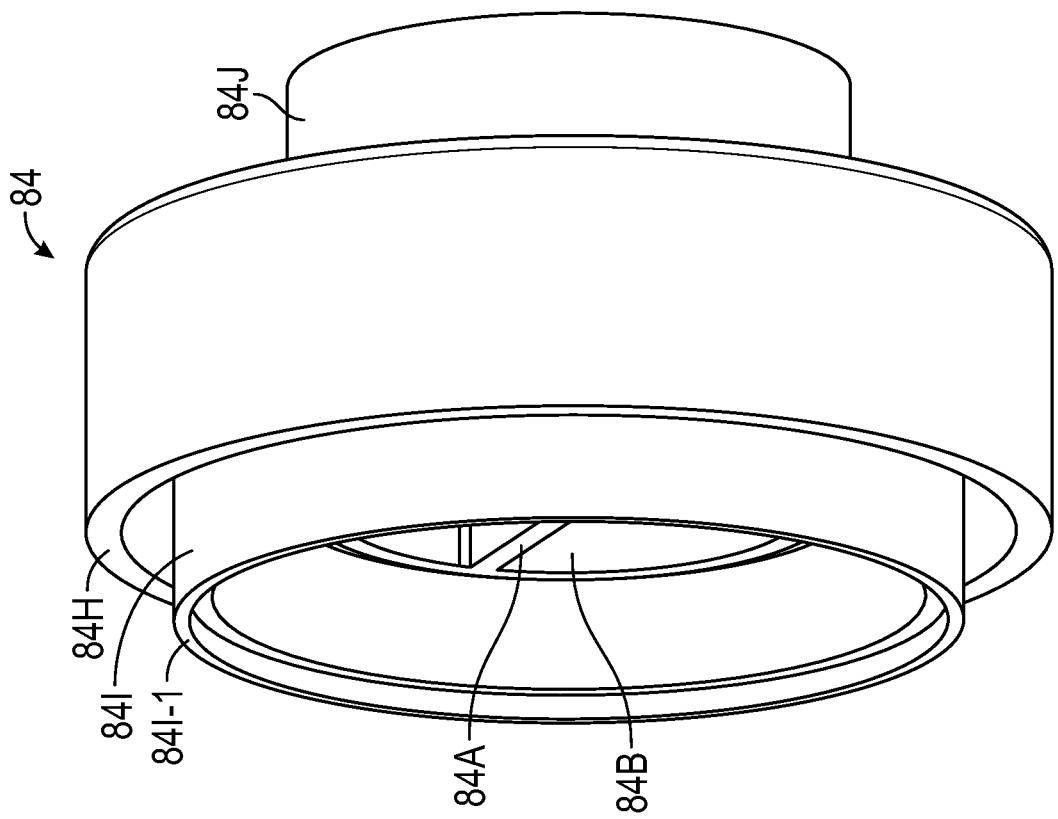
Figure 5D:
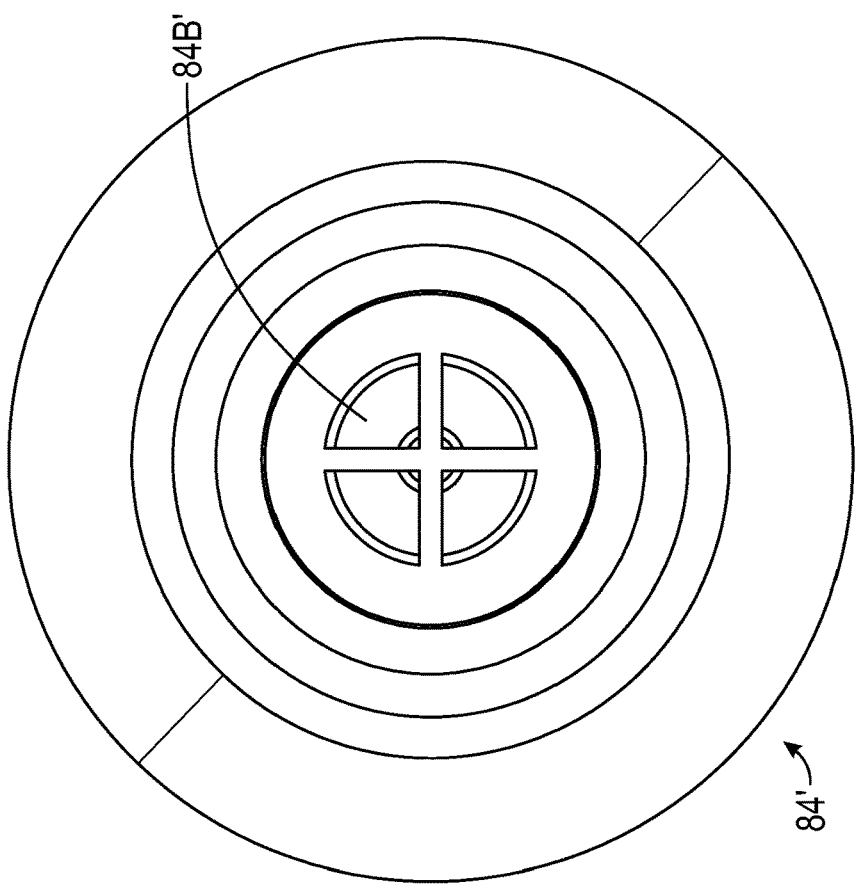
FIGS. 5C and 5D are respective end views of the plungers for low and high flow pumps, respectively.
Figure 5C:
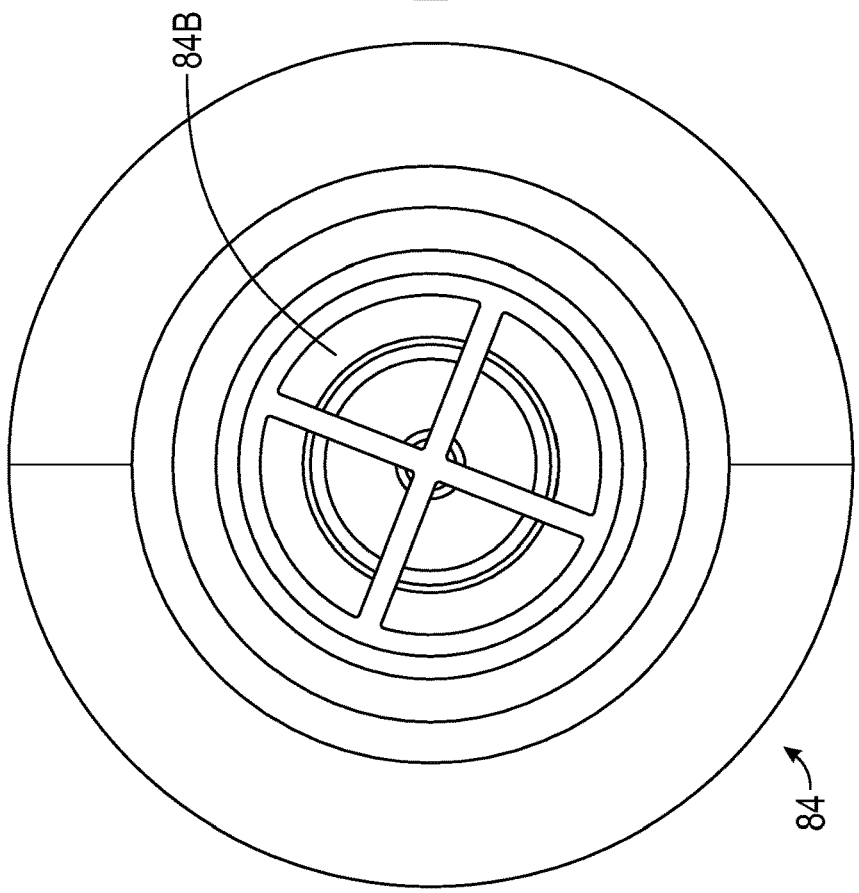

FIGS. 5A and 5B are side isometric views of the respective plungers 84 and 84'. FIGS. 5C and 5D are end views of the respective plungers 84A and 84A', showing the four orifices 84B, 84B' in the respective plungers.

Figure 6C:
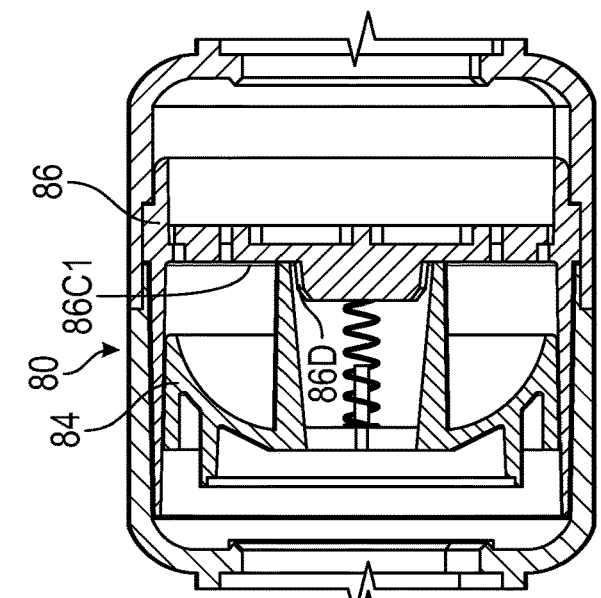
FIGS. 6A, 6B and 6C are side cutaway views of an exemplary embodiment of a flow control valve illustrating operation of the valve as water pressure is increased.
Figure 6B:
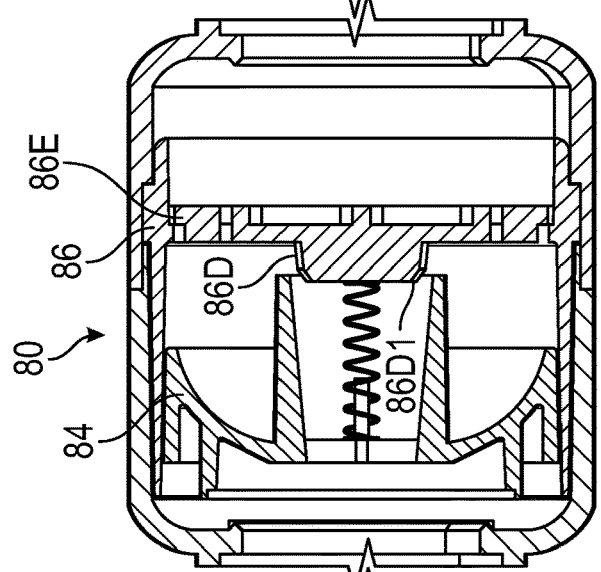
Figure 6A:
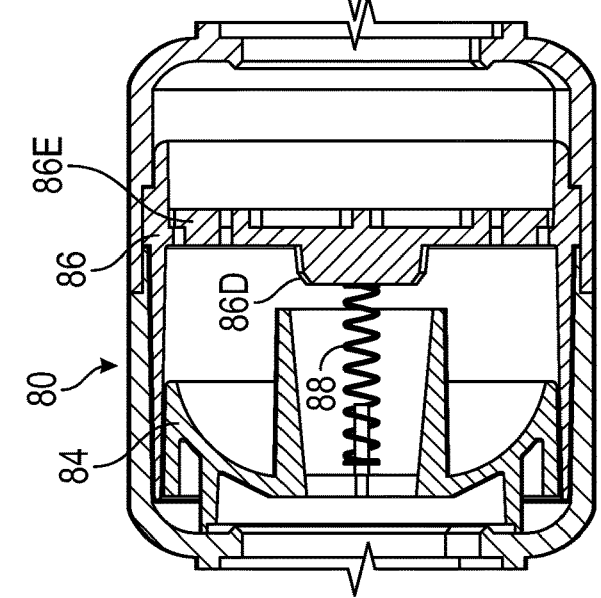

FIGS. 6A, 6B and 6C illustrate the operation of the exemplary flow control valve 80. As the water pressure increases, the plunger 84 will move toward the retainer 86 and control the amount of water that can flow through the valve.

FIG. 6A illustrates the plunger 84 in the fully open position relative to the retainer 86, allowing water flow through the orifice in the plunger, around the boss 86D and through the retainer orifices 86E. The open position occurs when the water flow through the valve 80 is insufficient to overcome the spring bias to compress the spring.

FIG. 6B shows the plunger 84 in an intermediate position relative to the retainer 86, with the distal edge 84J1 of the plunger positioned at the tip 86D1 of the boss 86D, reducing the opening size through which water can flow. To achieve this intermediate position, the water flow rate is increased sufficiently to exert sufficient force to compress the spring 88 to the extent illustrated.

FIG. 6C illustrates the valve 80 with the plunger 84 in the fully closed position, with the spring 88 compressed such that the distal edge 84J1 is positioned against the surface 86C1 of the retainer, effectively closing off the water flow path through the plunger and retainer orifices.

As flow is reduced through the flow control valve 80 to the heat pump (in the spa installation of FIG. 1), the flow through the bypass path (pipe section 60D) back to the spa tub 10 is increased.

The flow control valve 80 is an effective tool to allow easy installation of the heat pump 70 in a bathing installation using either a circulation pump or a two-speed pump. The valve ensures proper flow through the heat pump and alleviates the need for measuring and optimizing flow when installing the heat pump. For example, it has been found that an exemplary flow control valve 80 using a retainer 84 with the larger orifice size can work in a spa system as illustrated in FIG. 1 with a two-speed pump when using 2-inch pipe plumbing, and with a circulation pump when using 1.5 inch pipe plumbing. In this exemplary two-speed pump, the high speed operates on a current draw from 8.8 A to 16.4 A, and the low speed on a current draw from 2 A to 4.4 A. The circulation pump operates on a current draw of 1 A to 1.1 A.

In a further example, it has been found that an exemplary flow control valve 80' using a retainer 84' with the smaller orifice size can work in a spa system as illustrated in FIG. 1 with a two-speed pump when using 2-inch pipe plumbing, and with a circulation pump when using 2-inch pipe plumbing. In this exemplary two-speed pump, the high speed operates on a current draw from 8.8 A to 16.4 A, and the low speed on a current draw from 1 A to 1.1 A. The circulation pump operates on a current draw of 1 A to 1.1 A.

Although the foregoing has been a description and illustration of specific embodiments of the subject matter, various modifications and changes thereto can be made by persons skilled in the art without departing from the scope and spirit of the invention.

What is claimed is:

1. A bathing installation comprising:
   a tub for holding bathing water and including one or more water inlet ports and a water outlet port;
   a recirculating water flow path connecting the tub inlet port and the tub outlet port;
   a water pump connected to the tub output port to pump water through the water flow path;
   a heat pump connected in the water flow path for temperature conditioning the bathing water;
   the water flow path including a water bypass path to divert water to the inlet port before reaching the heat pump;
   a flow control valve positioned in the recirculating water flow path downstream of the water bypass path and upstream of the heat pump, the flow control valve configured to dynamically regulate water flow through the valve in dependence on the water pressure applied to the valve, the flow control valve to operate between an open state and a closed state, as water pressure increases to a value that causes the valve to be placed in the closed state;
   wherein as the water pressure applied to the valve increases, an amount of water diverted to the water bypass path increases to reduce the water flow to the heat pump, the valve serving to maintain the water flow to the heat pump to a given flow for efficient heat pump operation, and to prevent the water flow to the heat pump from exceeding a predetermined maximum water flow that would lead to heat pump damage.

2. The bathing installation of claim 1, wherein the water flow valve comprises:
   a housing structure having a water input port and a water output port;
   a retainer structure positioned in a fixed position inside the housing structure, the retainer structure including a transverse structure including one or more retainer orifices;
   a plunger structure positioned inside the housing structure and configured for sliding movement inside the retainer structure between an open position relative to the retainer structure and a closed position relative to the retainer structure, the plunger structure defining one or more plunger orifices;
   a bias structure configured to bias the plunger structure to the open position in which water flow is permitted through the one or more plunger orifices and the one or more retainer orifices from the input port to the output port, and is configured to allow the plunger structure to slide within the retainer structure in response to increased water pressure applied to the input port, allowing the plunger structure to slide toward the closed position in response to a sufficiently increased pressure, wherein the water flow through the one or more retainer orifices is prevented.

3. The bathing installation of claim 2, wherein the housing structure includes a cylindrical housing portion in which the retainer structure and plunger structure are positioned.

4. The bathing installation of claim 3, wherein:
   the retainer structure includes a retainer cylindrical surface dimensioned to fit within the cylindrical portion of the housing structure, the transverse structure extending across the retainer cylindrical surface;
   the plunger structure includes an outer cylindrical surface configured to slidingly fit within the retainer cylindrical surface with a tolerance, and an inner cylindrical surface having a distal end configured to contact the transverse structure with the plunger structure in the closed position.

5. The bathing installation of claim 4, wherein the retainer structure further includes:
   a transverse web structure extending across said inner cylindrical surface, said transverse web structure defining said one or more plunger orifices through which water flows through the inner cylindrical surface when the plunger structure is not in the closed position.

6. The bathing installation of claim 5, wherein:
   the bias structure is a spring;
   the transverse structure of the retainer structure includes a protruding center boss portion with a spring retainer post extending toward the input opening;
   the web structure includes a plunger spring post extending toward the transverse structure;
   the spring having a first end fitted onto the plunger spring post and a second end fitted onto the retainer spring post.

7. The bathing installation of claim 1, wherein the pump is a multiple speed pump operable at a plurality of pump speeds.

8. The bathing installation of claim 7, wherein the multiple speed pump is a two-speed pump having a pump low speed and a pump high speed, and wherein, for pump low speed operation, the flow control valve is configured to regulate the water flow to the heat pump to a nominal value plus/minus a nominal tolerance, the nominal value selected for efficient operation of the heat pump, and for pump high speed operation, the flow control valve is configured to regulate the water flow to the heat pump to be less than a predetermined flow rate which can cause damage to the heat pump.

9. The bathing installation of claim 8, wherein the nominal tolerance is ten percent of the nominal value.

10. The bathing installation of claim 1, further comprising a controller, an electrode heating element disposed in the recirculation flow path, and a control panel responsive to user input commands, and wherein the controller is responsive to the user input commands, and the controller is connected to the heat pump and the electrode heating element and configured to control operation of the heat pump and electrode heating element.

11. The bathing installation of claim 10, wherein the bathing installation water may be heated by the electrode heating element, or by the heat pump, or both, under control of the controller.

12. In a bathing installation including a tub for holding bathing water and including an water inlet port and a water outlet port, a recirculating water flow path connecting the tub inlet port and the tub outlet port, a water pump connected to the tub output port to pump water through the water flow path, and a heat pump connected in the water flow path for temperature conditioning the bathing water, the combination comprising:
  a water bypass path in the recirculating water flow path configured to divert water to the inlet port before reaching the heat pump;
  a flow control valve positioned in the recirculating water flow path downstream of the water bypass path and upstream of the heat pump, the flow control valve configured to dynamically regulate water flow through the valve in dependence on the water pressure applied to the valve, the flow control valve to operate between an open state and a closed state, as water pressure increases to a value that causes the valve to be placed in the closed state;
  wherein as the water pressure applied to the valve increases, an amount of water diverted to the water bypass path increases to reduce the water flow to the heat pump, the valve serving to maintain the water flow to the heat pump to a given flow for efficient heat pump operation, and to prevent the water flow to the heat pump from exceeding a predetermined maximum water flow that would lead to heat pump damage.

13. The combination of claim 12, wherein the pump is a multiple speed pump operable at a plurality of pump speeds.

14. The combination of claim 13, wherein the multiple speed pump is a two-speed pump having a pump low speed and a pump high speed, and wherein, for pump low speed operation, the flow control valve is configured to regulate the water flow to the heat pump to a nominal value plus/minus a nominal tolerance, the nominal value selected for efficient operation of the heat pump, and for pump high speed operation, the flow control valve is configured to regulate the water flow to the heat pump to be less than a predetermined flow rate which can cause damage to the heat pump.

15. The combination of claim 14, wherein the nominal tolerance is ten percent of the nominal value.

* * * * *